Jan. 27, 1953    M. M. BARTON    2,626,647
FLEXIBLE CONTAINER
Filed Feb. 23, 1951
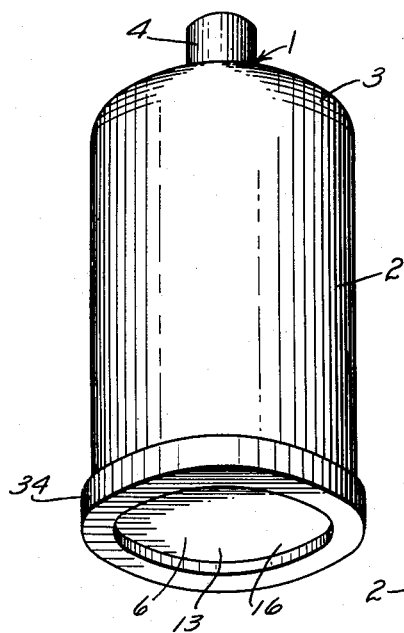
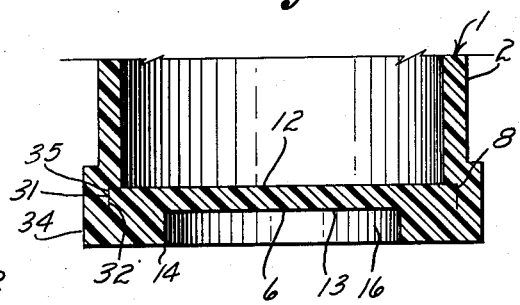
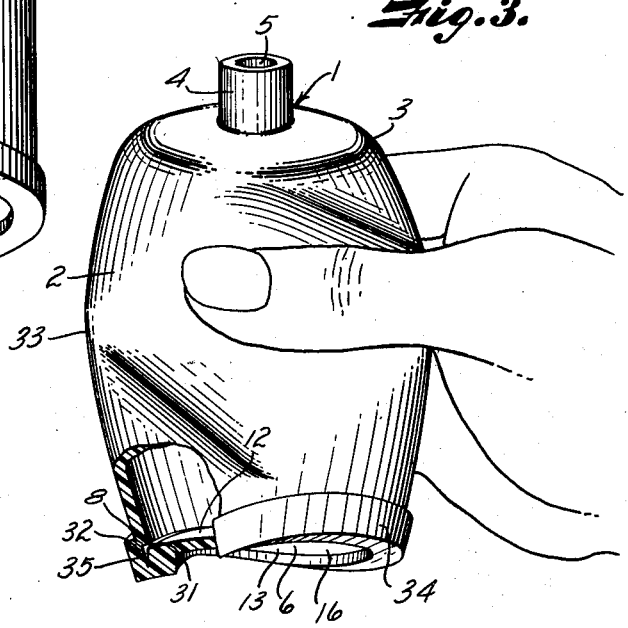
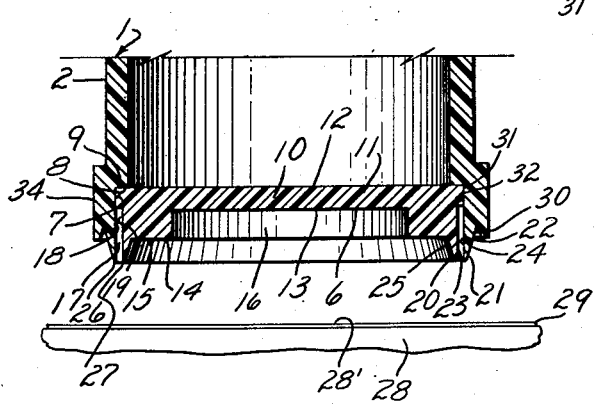
INVENTOR.
Murray M. Barton
BY
Fishburn & Mullendore
ATTORNEYS.

Patented Jan. 27, 1953

2,626,647

UNITED STATES PATENT OFFICE 2,626,647

FLEXIBLE CONTAINER

Murray M. Barton, Kansas City, Mo., assignor to Injection Molding Company, Kansas City, Mo., a corporation of Missouri Application February 23, 1951, Serial No. 212,393

4 Claims. (Cl. 150—.5)

This invention relates to bottles and similar containers formed of plastic material, the present invention being a division of my copending application for United States Letters Patent on "Method of Sealing Hollow Bodies," Serial No. 90,723, filed April 30, 1949, now Patent No. 2,546,208.

It is disclosed in the above entitled application that bottles and similar containers may be formed of plastic materials in high production dies by providing the containers with an opening of sufficient size to permit withdrawal of the core element of the die and close this opening by a closure which is inserted within the container and fused together with a portion of the container to form an integral structure.

The present application relates to the bottle or container per se and has for its principal object to provide a flexible plastic container wherein the wall portion surrounding the insert is free of strain when the container is flexed as when expelling the contents thereof.

A further object is to provide a container formed of plastic material and having flexibility in the rim and base portion thereof so as to provide maximum flexure of the container wall.

In accomplishing these and other objects of the invention as hereinafter pointed out, I have provided an improved structure, the preferred form of which is illustrated in the accompanying drawing wherein:

Fig. 1 is a perspective view of a container in the form of a bottle constructed in accordance with the present invention.

Fig. 2 is an enlarged section through the base portion of the bottle which is illustrated in Fig. 1.

Fig. 3 is a perspective view of the bottle being flexed, a portion of the bottom and side wall being broken away and shown in section.

Fig. 4 is a section similar to Fig. 2 but showing the bottom insert in position within the container prior to fusing of the respective portions thereof in forming the container.

Referring more in detail to the drawings:

1 designates a hollow body in the form of a bottle having a side wall 2 that may be of cylindrical formation and have a dome shaped top 3 provided with a neck 4 of substantially smaller diameter than the inner diameter of the wall 2, the neck 4 being provided with an axial opening 5 through which the bottle is filled and the contents discharged when the bottle is in use. The bottle has a bottom 6 integrally connected with the side wall in accordance with the present invention.

It has been found desirable to form such hollow bodies from flexible self-sustaining thermoplastic materials by injection molding. Such plastics result in many advantages over the usual metal and glass because the containers can be transparent or opaque colored, light in weight, shatter-proof, and provided with flexible side walls. However, to manufacture such articles from plastics on a commercial basis by injection molding, they must be formed under heat and pressure with a core being needed to form the interior shape thereof and an opening is required to permit removal of the core.

In constructing the container illustrated in accordance with the method disclosed in my copending application, the container is initially formed with a bottom opening 7 equal in size or preferably larger than the interior diameter of the wall 2 as shown in Fig. 4. The opening 7 is of a shape corresponding to the interior cross sectional shape of the container but of larger size to provide an annular inset shoulder 8 to form a stop face 9 for seating a closure member or insert 10 constituting the bottom 6. The member 10 consists of a disk-like body 11 having a substantially flat upper face 12 and an outer bottom face 13 provided with a continuous right angularly disposed flange 14 projecting therefrom substantially the margin of the face 13. The flange 14 extends outwardly and has an annular end face 15 terminating in substantially the same plane as the end face of the wall 2 so that the flange on the insert is surrounded by the end wall portion of the container when the insert is in place and seated against the stop face 9 of the shoulder 8. The inert thus has a central recess 16 so that the face portion 15 forms with the end face of the wall 2 a base or raised rim on which the container is adapted for support. The end wall portion of the container is offset outwardly to provide an outwardly extending rim portion. The flange 14 shown in Fig. 4 has the outer end thereof of smaller outer diameter than the inner diameter of the opening 7 so as to leave an annular space or groove 17 between the inner circumferential face 18 of the opening 7 and the outer circumferential face 19 of the flange when the closure is inserted within the opening and engaging the stop face 9 of the shoulder 8.

In sealing the insert, the flange of the insert and end portion of the wall 2 of the container have continuous depending lips 20 and 21, each having an inner and outer face 22 and 23 respectively, registering with and forming continuations of the circumferential faces 18 and 19. The opposite faces 24 and 25 of the lips are tapered to provide relatively thin terminal edges 26 and 27 as shown in Fig. 4. The lips contain in themselves a sufficient amount of material to effect substantial fill of the groove 17 when the lips are fused together. Fusing of the lips is effected by pressing the base of the container against a plane surface 28' of a suitable heater indicated at 28 indicated at Fig. 4, a sheet of material 29 being inserted between the container and the heater to prevent sticking of the lips to the hot surface of the heater. Upon contact with the heated surface the relatively thin terminal edges 26 and 27 of the lips readily melt and the pressure applied by the bottle brings the melted material together over the groove 17 and the action is such that the melted material enters the groove 17 to form a liquid tight seal and integrally unite the bottom closure with the wall of the container as shown in Fig. 2. When thus formed, the bottom faces of the end portion of the wall 2 and flange 14 are joined on a continuous plane and form a smooth surface on which the bottle is adapted for support in an upright position. If desired, an annular groove 30 may be provided in the end portion of the container wall at the base of the lip 20 to receive any overflow that may occur from fusion of the lips.

It will be readily apparent that the thermoplastic closure or insert is substantially complemental in size and shape with the open end of the thermoplastic container, and that the closure or insert has a right angularly disposed flange on its outer face substantially at the margin thereof and when the closure is disposed within the open end portion of the container that the flange extends outwardly and terminates in substantially the same plane as the end wall of the container so that the flange on the closure is surrounded by this end wall portion of the container. In this manner, continuous outer terminal ends of the end portion of the container and the end of the flange are presented outwardly. The heat and pressure when applied to the outwardly presented portions fuses the material and the fused material will flow into the recess 17, when such recess is provided, to form an integral seal between the closure or insert and the container. However, it will be noted that the bottom insert or closure has a continuous edge portion 31 on the inside of the container which is close to but free from a surrounding corresponding portion 32 of the end portion of the wall 2. The face 9 of the shoulder 8 is also free from the contacting marginal part of the insert so that when the container is completed, the continuous portions which are free from each other promote flexibility of the bottom of the completed container and relieve the wall 2 and the bottom 6 from strain when the container is pressed as shown in Fig. 3. The raised rim portions that are formed by the flange 14 and the outwardly offset end portion of the wall 2 provide a thick integral base portion.

In using the container constructed and assembled as described, a liquid to be contained therein is inserted through the opening 5 of the neck 4 and a suitable stopper or cap (not shown) is provided to close the opening 5. When it is desired to dispense the content, the closure is removed and pressure is applied to opposite sides of the wall 2 of the container by holding the container between the thumb and finger and applying pressure to move opposite wall portions toward each other as shown in Fig. 3 and thereby effect displacement of the container to a portion of the contents through the opening 5. During flexure of the container the wall portions opposite the sides to which the pressure is applied bulge outwardly as indicated at 33, Fig. 3, and the bottom is caused to curve transversely of the direction pressure is applied by the thumb and finger. That is, the diametrical sides of the base or rim portion 34 are caused to move downwardly. However, the parts are free of strain because the free edge portion of the bottom or closure and free corresponding wall portion of the container move apart as indicated at 35 in Fig. 3. Since the unattached portions are continuous about the container, stress may be relieved regardless of the points at which the pressure may be applied to the sides of the container.

It is thus obvious that a container of the character described is especially adapted for dispensing various liquids responsive to pressure on the walls thereof and that the structure provided eliminates stresses and provides maximum flexibility through flexure of the relatively thick base rim of the container made possible by the unattached inner portions which freely accommodate themselves relatively to the corresponding portion of the flexed bottom and wall of the container.

What I claim and desire to secure by Letters Patent is:

1. A flexible self-sustaining thermoplastic injection molded container having a wall and a closed bottom integrally connected with the wall, said wall having an annular shoulder extending outwardly from the inner side of said wall, said bottom on the inner side of the container having a continuous edge portion abutting said shoulder and close to but free from a corresponding portion of said wall outwardly from said shoulder surrounding said edge portion of the bottom to relieve strain of the bottom with respect to said wall of the container when the container is flexed.

2. A flexible self-sustaining thermoplastic injection molded container having a wall portion and a closed bottom integrally connected with the wall and continuous raised rim portions extending about the marginal edge of said bottom and outwardly of said wall to provide a thickened uninterrupted base portion surrounding said bottom and integral with said wall and bottom, said wall having an annular shoulder extending outwardly from the inner side of said wall and located within said base portion, the bottom on the inner side of the container having a continuous edge portion close to but free from a corresponding portion of said wall outwardly from said shoulder and surrounding said edge portion of the bottom to relieve strain of the bottom with respect to said wall when the container is flexed.

3. A flexible self-sustaining thermoplastic injection molded container having a wall portion and a closed bottom integrally connected with the wall and continuous raised rim portions extending about the marginal edge of said bottom and outwardly of said wall to provide a thickened uninterrupted base portion surrounding said bottom and integral with said wall and bottom, the bottom on the inner side of the container having a continuous edge portion close to but free from a corresponding portion of said wall surrounding the same to relieve strain of the bottom with respect to said wall when the container is flexed, said wall having an internal annular stop shoulder on the inner side thereof engaged by the bottom adjacent said free edge portion to cooperate with said integrally connected portion of the wall and bottom in resisting pressure tending to move the bottom into the container.

4. A flexible self-sustaining thermoplastic injection molded container having a wall and a continuous annular shoulder inset from one end of said wall on the inner side thereof, a thermoplastic closure inset within said end and having stop engaging contact with said shoulder with the entire end portion of the container wall encircling the shoulder and surrounding the closure, there being a thickened portion constituting an uninterrupted raised sealing rim integral with the end wall and a marginal portion of the closure, and a continuous edge portion of the closure immediately next to said shoulder being close to but free from a corresponding wall portion of the container that surrounds same to relieve strain on the closure with respect to the end wall of the container when the container is flexed.

MURRAY M. BARTON.

REFERENCES CITED

The following references are of record in the file of this patent:

UNITED STATES PATENTS

| Number | Name | Date |
| --- | --- | --- |
| 1,108,376 | Lannoye | Aug. 25, 1914 |
| 1,536,443 | Lermer | May 5, 1925 |